United States Patent
Dawson

(10) Patent No.: US 7,707,138 B2
(45) Date of Patent: Apr. 27, 2010

(54) IDENTIFYING COLUMNS FOR ROW BASED OPERATIONS

(75) Inventor: Colin Scott Dawson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 11/399,012

(22) Filed: Apr. 5, 2006

(65) Prior Publication Data
US 2007/0239665 A1    Oct. 11, 2007

(51) Int. Cl.
G06F 7/00    (2006.01)
(52) U.S. Cl. ................................. 707/2; 707/4; 707/100
(58) Field of Classification Search .................... 707/10, 707/4, 42, 2, 100; 709/151, 231, 217
See application file for complete search history.

(56) References Cited

U.S. PATENT DOCUMENTS

| | | | |
|---|---|---|---|
| 5,594,898 A | | 1/1997 | Dalal et al. |
| 5,860,070 A | | 1/1999 | Tow et al. |
| 5,918,232 A | * | 6/1999 | Pouschine et al. ....... 707/103 R |
| 5,988,854 A | * | 11/1999 | Munakata .................... 700/95 |
| 6,609,128 B1 | * | 8/2003 | Underwood ................. 707/10 |
| 6,654,758 B1 | * | 11/2003 | Teague ....................... 707/101 |
| 6,691,166 B1 | | 2/2004 | Gasior et al. |
| 6,826,563 B1 | | 11/2004 | Chong et al. |
| 6,859,808 B1 | | 2/2005 | Chong et al. |
| 6,934,712 B2 | | 8/2005 | Kiernan et al. |
| 2003/0056082 A1 | * | 3/2003 | Maxfield ....................... 712/4 |

OTHER PUBLICATIONS

A. Witkowski, et al., "Advanced SWL Modeling in RDBMS", Oracle Corporation, ACM Transactions on Database Systems, vol. 30, No. 1, Mar. 2005, pp. 83-121.
B. Wruth, et al., "Functional Multiple-Output Decomposition With Application to Technology Mapping for Lookup Table-Based FPGAs", ACM Transactions on Design Automation of Electronic Systems, vol. 4, No. 3, Jul. 1999, pp. 313-350.

* cited by examiner

*Primary Examiner*—Vincent Boccio
(74) *Attorney, Agent, or Firm*—Janaki K. Davda; Konrad Raynes and Victor LLP

(57) ABSTRACT

Provided are techniques for, under control of a backup application, identifying one or more columns to be used by a row based operation. A row map is created that includes indicators which indicate the identified one or more columns. The row based operation is generated, wherein the row map is input as an argument to the row based operation, and the row based operation is forwarded to a database abstraction component. Under control of the database abstraction component, the row based operation is used to generate a database statement, wherein the row map is used to generate a portion of the database statement.

18 Claims, 4 Drawing Sheets

IDENTIFYING COLUMNS FOR ROW BASED OPERATIONS

BACKGROUND

1. Field

Embodiments of the invention relate to identifying columns for row based operations.

2. Description of the Related Art

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

A RDBMS uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns.

Applications are able to perform operations on databases, such as inserting data or retrieving data. Modern relational databases, such as a DB2® product available from International Business Machines Corporation, offer the capability of manipulating rows based on various discrete columns within the row. However, this causes difficulty for the application that wants to perform row based operations. A row based operation may be described as an operation that formulates a database statement (e.g., a SQL statement), such that the database statement acts on a given row in a database. Row based operations include, for example, insert, update, delete or fetch operations for a given row. Thus, a row based operation may be described as an operation using SQL in an RDMBS to operate on a row. For instance, if a table has 10 columns and the application wants to perform a row based operation on rows in that table based on the third, fourth, and seventh (3rd, 4th, 7th) columns, the application needs to be able to indicate the columns to the database. From an SQL perspective, this may include specifying a "where" clause, such as "where col3=NN and col4=YY and col7='abc'" in a SQL statement. Some applications generate the SQL statement, but this can contaminate the application code by making the application code aware of the database and syntax for row based operations.

Thus, there is a need in the art for abstracting row based operations from an application.

SUMMARY OF EMBODIMENTS OF THE INVENTION

Provided are a method, computer program product, and system for, under control of a backup application, identifying one or more columns to be used by a row based operation. A row map is created that includes indicators which indicate the identified one or more columns. The row based operation is generated, wherein the row map is input as an argument to the row based operation, and the row based operation is forwarded to a database abstraction component. Under control of the database abstraction component, the row based operation is used to generate a database statement, wherein the row map is used to generate a portion of the database statement.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
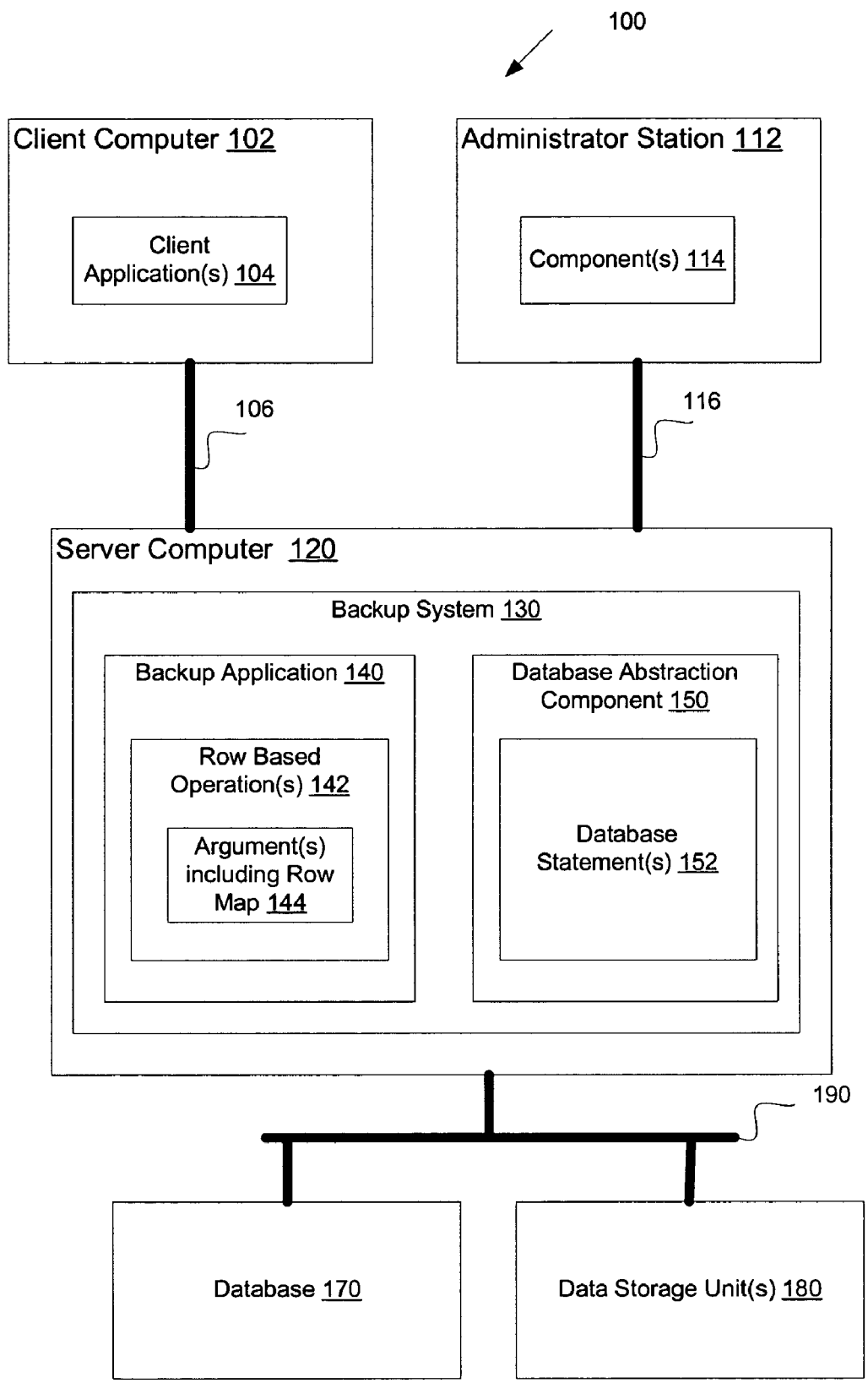
FIG. 1 illustrates a computing environment in accordance with certain embodiments.

FIG. 1 illustrates a computing environment 100 in accordance with certain embodiments. The computing environment 100 consists of one or more client computers 102, one or more administrator stations 112, and a server computer 120.

The client computers 102 are electronically connected to the server computer 120 via a communications channel 106. The client computers 102 provide a user with access to the server computer 120. Each client computer 102 includes one or more client applications 104 that submits requests to the server computer 120 (e.g., requests to backup data).

The administrator stations 112 are electronically connected to the server computer 120 via a communications channel 116. The administrator stations 112 may also be connected directly to the server computer 120 where proximity and function permit. The administrator stations 112 are configured to administer and monitor the functionality and processing of the server computer 120. Each administrator station 112 includes one or more components 114 to enable such administration and monitoring.

The server computer 120 is configured to store data and manage the stored data according to storage access requests from the client computers 102 and the administrator stations 112. The server computer 120 includes a backup system 130 and is operationally coupled to a database 170 and one or more data storage units 180. In certain embodiments, the server computer 120 is coupled to the data storage units 180 via a communications channel 190. The communications channel 190 may be a storage area network (SAN) or alternately may be similar to the communications channels 106 and 116. In certain embodiments, the storage units 180 may be direct attached to the server computer 120 with architectures, such as Small Computer System Interface (SCSI), Serial Storage Architecture (SSA) or other such direct attach hardware protocols. The backup system 130 includes a backup application 140 and a database abstraction component 150. The server computer may also include one or more other components (not shown).

The backup application 140 generates one or more row based operations 142. For each row based operation 142, the backup application 140 generates one or more arguments 144, including a row map. A row map may be described as a representation that identifies which columns of a row are to use be used in a database for a row based operation.

The database abstraction component 150 generates one or more database statements 152 (e.g., SQL statements) for each row based operation 142.

The ability to operate on rows based on one or more specified column values is advantageous for the backup application 140. The database abstraction component 150 abstracts the underlying database calls from the backup application 150. Such abstraction is useful because it provides autonomy for the backup application 140 from the database 160.

Thus, the database abstraction component 150 abstracts database access strategies and functions from the backup application 140. The database abstraction component 150 may be described as an interface or an abstraction layer. The database abstraction component 150 is extensible and flexible to allow for the exploitation of the database 160.

The server computer 120 illustrated may be a commercially available storage server or may be a compilation of compatible equipment configured to manage the data storage within the data storage units 180.

Each communication channel 106, 116, 190 may comprise, for example, a network, such as, for example, a peer-to-peer network, spoke and hub network, Storage Area Network (SAN), a Local Area Network (LAN), Wide Area Network (WAN), the Internet, an Intranet, etc. Alternatively, each communication channel 106, 116, 190 may include a wired network system, such as conductive wires or busses, fiber optic cables, or other physical structures suitable for conducting an electronic signal between network system components. In other embodiments, each communications channel 106, 116, 190 may include a wireless connection between network system components or a combination of wired and wireless components. Additionally, each communications channel 106, 116 may include means for connecting geographically distinct user stations 102 and/or administrator stations 112 with server computer 120, such as the internet using a customary transmission protocol like TCP/IP. Moreover, each communications channel 106, 116, 190 may also include a proprietary system in part or whole similar in function to the internet.

The database 170 may comprise, for example, an array of storage devices, such as Direct Access Storage Devices (DASDs), Just a Bunch of Disks (JBOD), Redundant Array of Independent Disks (RAID), virtualization device, etc.

The storage devices may comprise, for example, direct access storage devices (DASD) such as magnetic disk drives or optical disks and drives and sequential access storage devices, such as magnetic tape media and tape drives.

Merely to illustrate embodiments of the invention, examples of update and fetch row based operations are provided. However, embodiments of the invention are applicable to various row based operations, such as insert and delete.

For a given row based operation for which the backup application 140 wants to operate on one or more specific columns (e.g., for selection criteria to select data or as the target of the row based operation), the backup application 140 submits a row map as an argument for the row based operation to the database abstraction component 150. Selection criteria to select data relates to update, delete, and fetch operations. In each of these row based operations, some information is provided to select and act upon one or more appropriate rows in the database 170. In terms of the target of the row based operation, a given row based operation 142 has some intended operation which would be the target operation. In order for the row based operation 142 to carry out the intended or target operation, the row based operation 142 provides the appropriate information to allow the database abstraction component 150 to recognize what this target operation is and the information necessary to accomplish that operation.

The row map provides information used by the database abstraction component 150 to generate a database statement (e.g., SQL code) that indicates which columns are being operated on in the context of a particular row based operation. For example, assume that a table, "sample_table", has 7 columns (c0, c1, c2, c3, c4, c5, c6), with c0 and c1 being unique keys for the table. If the backup application 140 wants to update column c4 and c6, the backup application 140 specifies to the database abstraction component 150 the values for the keys for the rows to manipulate, along with an indication of which columns in the row to be updated. In certain embodiments, at a higher level view, row based operations 142 are performed, but, at a lower level view, these row based operations 142 are implemented as column functions (i.e., code or structure logic that performs the intended row based operation 142). The following is an example update column function for updating certain columns of a row for an update row based operation 142:

tbUpdate(sourceRow, updateRow, rowMap);

The backup application 140 generates the update column function. In the update column function, the sourceRow argument specifies appropriate key values for c0 and c1 for the row based operation. The updateRow argument contains the updated value for each column to be updated. The rowMap argument includes a row map that describes one or more indicators (e.g., flags) indicating which columns have a corresponding updated value from the updateRow argument for each row that is to be updated.

The database abstraction component 150 receives the update column function from the backup application 140 and uses the information in the arguments to generate a database statement, such as SQL statement (1):

UPDATE sample_table SET c4=123, c6=456
        WHERE c0='abc' and c1='efg'        Statement (1)

In this example, the database abstraction component 140 uses the row map when building the SET clause to indicate which columns to update and which column values to read from the updateRow argument. So, in this case, the rowMap argument has a "True" indicator for columns c4 and c6 to indicate that these columns are being used by the column function, while the other columns have a "False" indicator set to represent "not in use".

Similarly, the same approach may be used for other row based operations (e.g., fetch, insert or delete), where the row based operation is based on varying column values and combinations from the backup application 140.

For example, for a fetch row based operation, the row map would indicate which columns are being passed in to the underlying column function, and, in particular, which columns have values that should be used by the fetch row based operation to find the intended row in the database 170. To illustrate using the "sample table" above, if the backup application 140 wants to query the table using columns c4 and c6, an example fetch column function for a fetch row based operation 142 is:

tbFetch(sourceRow, rowMap, . . . );

The backup application 140 generates the fetch column function. In the fetch column function, the sourceRow argument identifies the value for each column value to use in the select statement. The rowMap argument includes a row map that describes one or more indicators (e.g., flags) indicating which columns are to be used to build the where clause for the database statement for each row to be selected. The ellipses indicate that one or more other arguments may be passed in by the backup application 140.

The database abstraction component 150 receives the fetch column function from the backup application 140 and uses the information in the arguments to generate a database statement, such as SQL statement (2):

SELECT*FROM sample_table WHERE C4=123 and
C6=456                                                Statement (2)

Again, in the fetch column function example, the rowMap argument has a "True" indicator for columns c4 and c6 to indicate that these columns are being used by the column function, while the other columns have a "False" indicator set to represent "not in use".

The row map has many uses. For instance, in a fetch row based operation, the rowMap may be used to specify which columns to return for the select result. For example, if c4 and c6 were the only columns desired to be returned from the fetch row based operation, the row map may be used to form the select statement as in statement (3):

SELECT c4, c6 FROM sample_table WHERE . . .          Statement (3)

The tbFetch column function discussed above does not illustrate this case, however, a fetch column function may specify a rowMap argument for the result columns to be returned.

In certain embodiments, the row map is a separate entity from other arguments. In certain embodiments, the row map may be "merged" into an updateRow argument in the case of the update column function and a sourceRow argument in the case of the fetch column function. The merging of the row map and the other row may be performed by including the indicator as part of the structure that represents a column. Merely to enhance understanding, an example is provided. For example, assume that a given column is represented by the backup application 140 as follows:

```
struct
{
    type        thisColType;
         value       thisColValue;
}
```

In this example, a row in the database 170 is an array of these structures, one each for each column in the row. Then, the following is an example of merging the row map into the row:

```
struct
{
    type     thisColType;
    value    thisColValue;
    flag     mapFlagValue;
}
```

Figure 2:
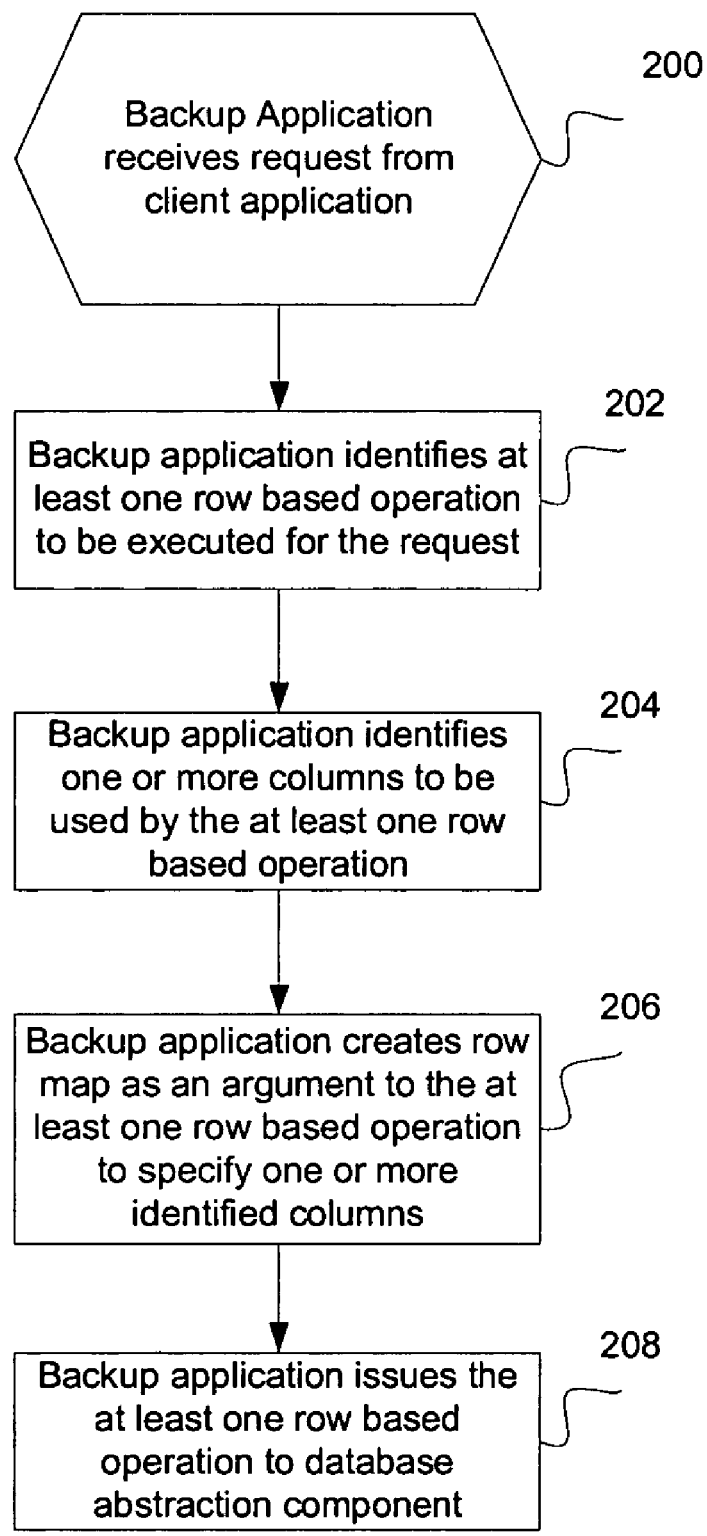
FIG. 2 illustrates logic performed by a backup application in accordance with certain embodiments.

FIG. 2 illustrates logic performed by the backup application 140 in accordance with certain embodiments. Control begins at block 200 with the backup application 140 receiving a request from a client application 104. In block 202, the backup application 140 identifies at least one row based operation to be executed for the request. In block 204, the backup application 140 identifies one or more columns to be used by the at least one row based operation. The row map may be used to specify which columns are used to determine the selection criteria for a row in support of a given row based operation. That is, the row map enables the backup application 140 to indicate which columns are to be used to find a row for a row based operation. The row map may also be used to indicate which columns are to be returned from a row as a result for a given row based operation.

In block 206, the backup application 140 creates a row map as an argument to the at least one row based operation to specify the identified one or more columns. In block 208, the backup application 140 issues the at least one row based operation to the database abstraction component 150.

Figure 3:
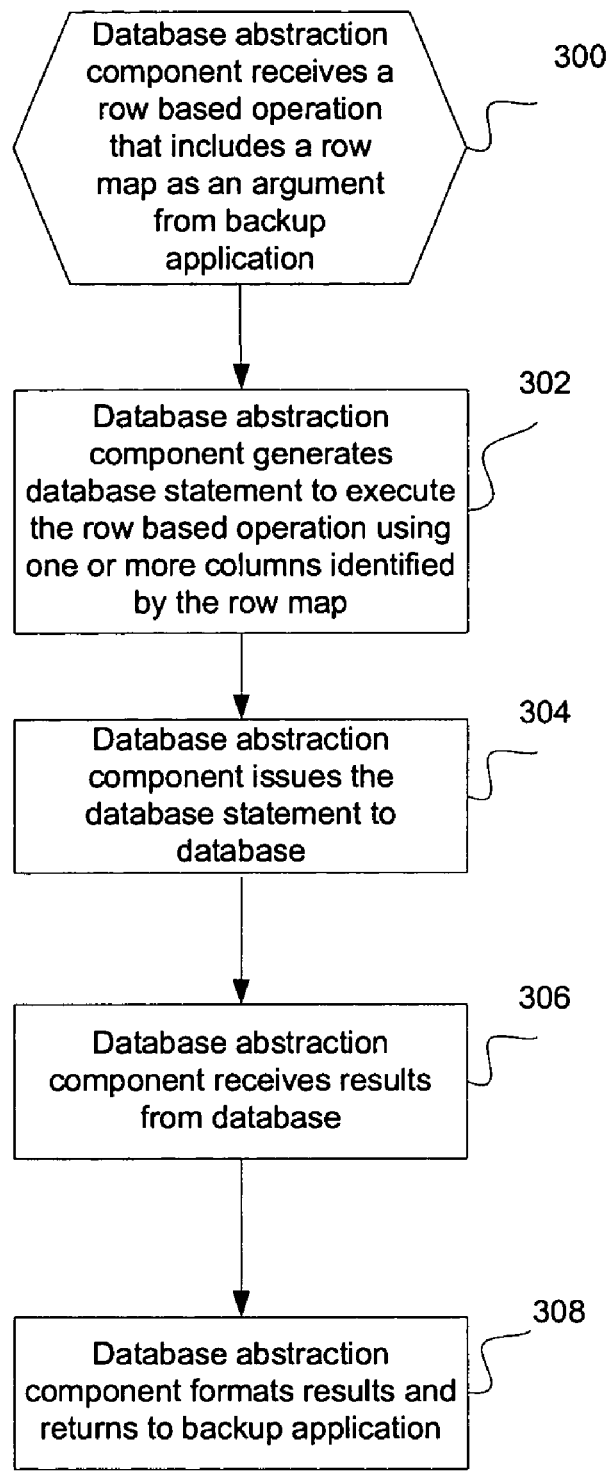
FIG. 3 illustrates logic performed by a database abstraction component in accordance with certain embodiments.

FIG. 3 illustrates logic performed by the database abstraction component 150 in accordance with certain embodiments. Control begins at block 300 with the database abstraction component 150 receiving a row based operation that includes a row map as an argument from the backup application 140. In block 302, the database abstraction component 150 generates a database statement to execute the row based operation using one or more columns identified by the row map. In certain embodiments, the row map is used to generate a portion of the database statement. In certain embodiments, the database statement generated by the database abstraction component 150 is an SQL statement. Different database vendors may implement different versions of SQL consistent with a particular standard, and embodiments are portable to different SQL compliant databases. Additionally, for database manipulation languages other than SQL, the database abstraction component 150 may be adapted to generate database statements for such languages. The backup application 140 is unaware or unchanged as a result of a different database access/manipulation capability. Moreover, the database abstraction component 150 may be adapted to generate database statements for a vendor specific implementation of SQL (e.g., one that differs significantly from a particular standard).

In block 304, the database abstraction component 150 issues the database statement to the database 170. In block 306, the database abstraction component 150 receives results from the database 170. In block 308, the database abstraction component 150 formats the results and returns the results to the backup application 140.

Thus, the backup application 140 communicates the values for a row based operation, the columns to be used for the row based operation, and the ordering of those columns to the database abstraction component 150. The database abstraction component 150 generates database statements for the backup application 140. Because database specific knowledge is maintained in the database abstraction component 150, the backup application 140 maintains autonomy and is more readily and easily portable to other architectures and databases. Thus, embodiments provide a representation and expression that allows the backup application 140 to specify one or more columns for a row based operation to the database abstraction component 150. In, particular, the backup application 140 creates a row map. The row map may be used either to specify the selection criteria (i.e., how do to find a row) for a row in the database or specify which columns are to be returned to the backup application 140 from the row based operation. Thus, the row map is a generalized mechanism for representing which columns are to be used by the database abstraction component 150 on behalf of the backup application 140.

DB2 is a registered trademark or common law mark of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The computer-usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2 and 3 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2 and 3 may be implemented in software, hardware, programmable and non-programmable gate array logic or in some combination of hardware, software, or gate array logic.

Figure 4:
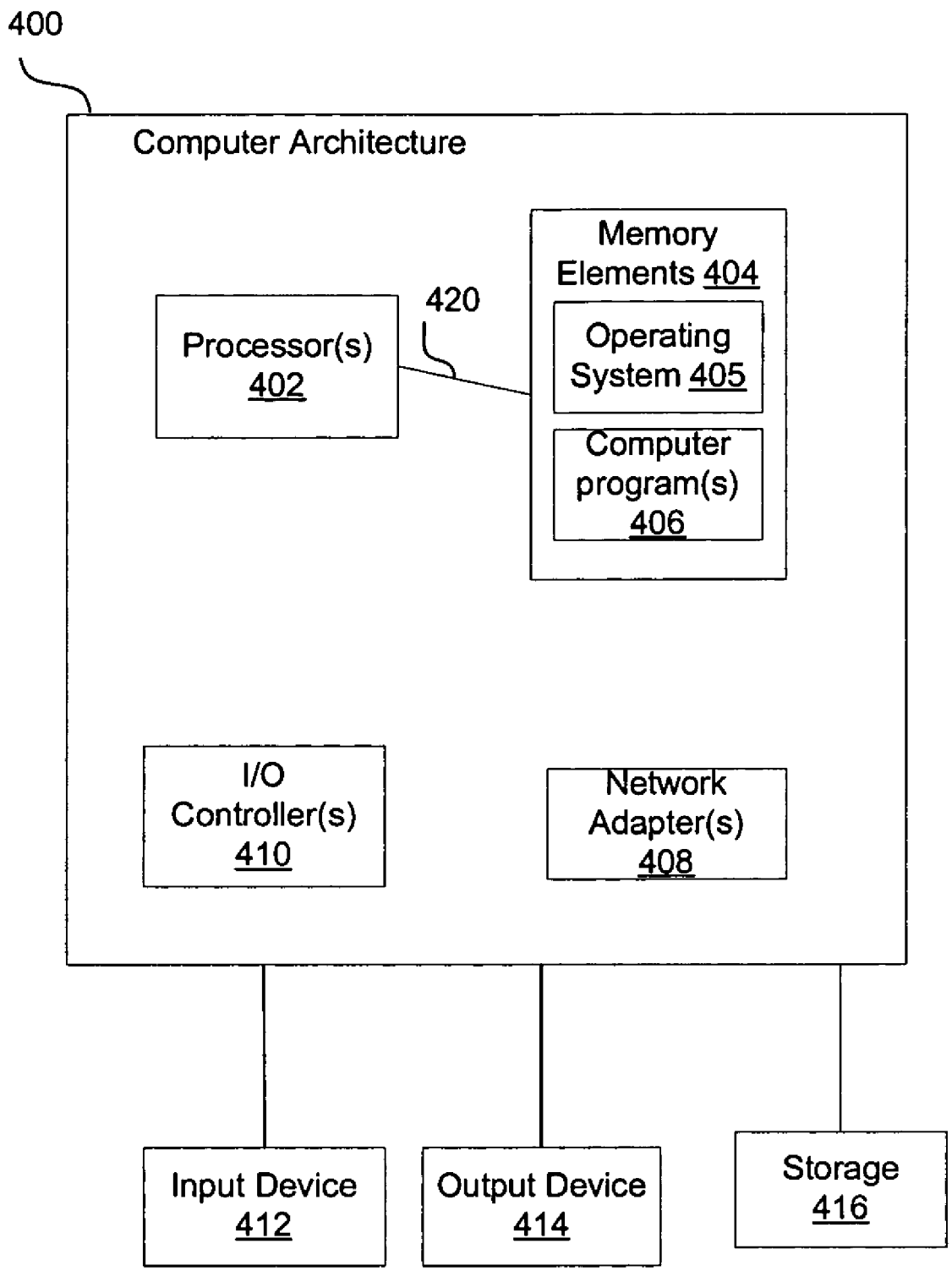
FIG. 4 illustrates a system architecture that may be used in accordance with certain embodiments.

FIG. 4 illustrates a system architecture 400 that may be used in accordance with certain embodiments. Client computers 102, administrator stations 112, and server computer 120 may each implement system architecture 400. The system architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The system architecture 400 may be coupled to storage 416 (e.g., a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The system architecture 400 may include fewer components than illustrated, additional components not illustrated herein, or some combination of the components illustrated and additional components. The system architecture 400 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching.

It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for processing a request, comprising:
under control of a backup application executing on a computer including a processor,
identifying one or more columns of a table to be used by a row based operation;
creating a row map that includes indicators that are set to TRUE for the identified one or more columns that are to be used by the row based operation and that includes indicators that are set to FALSE for columns that are not used by the row based operation, wherein the row map includes an indicator for each column in the table;
generating the row based operation implemented as a column function with a sourceRow argument and a row map argument identifying the row map; and
forwarding the row based operation having the row map as an argument to a database abstraction component; and
under control of the database abstraction component that abstracts database access strategies from the backup application that is unaware of the database access strategies,
using the row based operation to generate a database statement, wherein the row map is used to identify the one or more columns that are used to generate a portion of the database statement by:
for an update operation, wherein the sourceRow argument specifies key values for key columns, using the identified one or more columns in a SET clause in the database statement and the key values and the key columns in a WHERE clause of the database statement; and
for a fetch operation, using the identified one or more columns in a WHERE clause for the database statement.

2. The method of claim 1, further comprising:
under control of the backup application, receiving a request from a client application.

3. The method of claim 1, further comprising:
under control of the database abstraction component,
issuing the database statement against a database;
receiving results from the database; and
forwarding the results to the backup application.

4. The method of claim 1, wherein the row based operation comprises one of an insert operation, the update operation, a delete operation, and the fetch operation.

5. The method of claim 1, wherein the row map is merged into an updateRow argument for an update column function.

6. The method of claim 1, wherein the row map is merged into the sourceRow argument for a fetch column function.

7. A computer program product comprising a computer readable medium including a computer readable program, wherein the computer readable program when executed by a processor on a computer causes the computer to:
under control of a backup application,
identify one or more columns of a table to be used by a row based operation;
create a row map that includes indicators that are set to TRUE for the identified one or more columns that are to be used by the row based operation and that includes indicators that are set to FALSE for columns that are not used by the row based operation, wherein the row map includes an indicator for each column in the table;
generate the row based operation implemented as a column function with a sourceRow argument and a row map argument identifying the row map; and
forward the row based operation having the row map as an argument to a database abstraction component; and
under control of the database abstraction component that abstracts database access strategies from the backup application that is unaware of the database access strategies,
use the row based operation to generate a database statement, wherein the row map is used to identify the one or more columns that are used to generate a portion of the database statement by:
for an update operation, wherein the sourceRow argument specifies key values for key columns, using the identified one or more columns in a SET clause in the database statement and the key values and the key columns in a WHERE clause of the database statement; and
for a fetch operation, using the identified one or more columns in a WHERE clause for the database statement.

8. The computer program product of claim 7, wherein the computer readable program when executed on a computer causes the computer to:
under control of the backup application, receive a request from a client application.

9. The computer program product of claim 7, wherein the computer readable program when executed on a computer causes the computer to:
under control of the database abstraction component,
issue the database statement against a database;
receive results from the database; and
forward the results to the backup application.

10. The computer program product of claim 7, wherein the row based operation comprises one of an insert operation, the update operation, a delete operation, and the fetch operation.

11. The computer program product of claim 7, wherein the row map is merged into an updateRow argument for an update column function.

12. The computer program product of claim 7, wherein the row map is merged into the sourceRow argument for a fetch column function.

13. A system for processing a request, comprising:
hardware logic capable of performing operations, the operations comprising:
under control of a backup application,
identifying one or more columns of a table to be used by a row based operation;
creating a row map that includes indicators that are set to TRUE for the identified one or more columns that are to be used by the row based operation and that includes indicators that are set to FALSE for columns that are not used by the row based operation, wherein the row map includes an indicator for each column in the table;

generating the row based operation implemented as a column function with a sourceRow argument and a row map argument identifying the row map; and forwarding the row based operation having the row map as an argument to a database abstraction component; and under control of the database abstraction component that abstracts database access strategies from the backup application that is unaware of the database access strategies, using the row based operation to generate a database statement, wherein the row map is used to identify the one or more columns that are used to generate a portion of the database statement by:

for an update operation, wherein the sourceRow argument specifies key values for key columns, using the identified one or more columns in a SET clause in the database statement and the key values and the key columns in a WHERE clause of the database statement; and for a fetch operation, using the identified one or more columns in a WHERE clause for the database statement.

14. The system of claim 13, further comprising:
under control of the backup application, receiving a request from a client application.

15. The system of claim 13, further comprising:
under control of the database abstraction component,
issuing the database statement against a database;
receiving results from the database; and
forwarding the results to the backup application.

16. The system of claim 13, wherein the row based operation comprises one of an insert operation, the update operation, a delete operation, and the fetch operation.

17. The system of claim 13, wherein the row map is merged into an updateRow argument for an update column function.

18. The system of claim 13, wherein the row map is merged into the sourceRow argument for a fetch column function.

* * * * *